US012798682B2

(12) United States Patent
Yun et al.

(10) Patent No.: US 12,798,682 B2
(45) Date of Patent: Nov. 17, 2026

(54) FRONT SIDE BODY STRUCTURE FOR A VEHICLE

(71) Applicants: HYUNDAI MOTOR COMPANY, Seoul (KR); KIA CORPORATION, Seoul (KR)

(72) Inventors: Jong Gwan Yun, Busan (KR); Yong Dok An, Anyang-si (KR); Do Hoi Kim, Sejong-si (KR); Mun Soo Cha, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 232 days.

(21) Appl. No.: 18/816,064

(22) Filed: Aug. 27, 2024

(65) Prior Publication Data

US 2025/0326441 A1 Oct. 23, 2025

(30) Foreign Application Priority Data

Apr. 23, 2024 (KR) ........................ 10-2024-0054225

(51) Int. Cl.
*B62D 25/08* (2006.01)
*B62D 21/15* (2006.01)
(Continued)

(52) U.S. Cl.
CPC ......... *B62D 25/085* (2013.01); *B62D 21/152* (2013.01); *B62D 25/04* (2013.01);
(Continued)

(58) Field of Classification Search
CPC .... B62D 25/085; B62D 25/04; B62D 25/082; B62D 25/088; B62D 25/08; B62D 25/18;
(Continued)

(56) References Cited

U.S. PATENT DOCUMENTS 5,470,125 A 11/1995 Yamazaki
5,599,057 A 2/1997 Hirahara et al.
(Continued)

FOREIGN PATENT DOCUMENTS

CN 212797105 U 3/2021
CN 114104118 A 3/2022
(Continued)

OTHER PUBLICATIONS

Office action cited in U.S. Appl. No. 18/816,350; Jul. 7, 2026; 34 pp.
(Continued)

*Primary Examiner* — Patricia L Engle
(74) *Attorney, Agent, or Firm* — Lempia Summerfield Katz LLC

(57) ABSTRACT

A front side body structure for a vehicle includes a front side member extending in a longitudinal direction of a vehicle, a shock absorber housing disposed between a front end and a rear end of the front side member and connected to the front side member, and an A-pillar connected to the rear end of the front side member. The front side member, the shock absorber housing, and the A-pillar are integrally formed. A front end of a fender apron member is connected to the front end of the front side member and a rear end of the fender apron member is inserted into an assembling groove of the shock absorber housing.

10 Claims, 7 Drawing Sheets

(51) Int. Cl.
*B62D 25/04* (2006.01)
*B62D 27/04* (2006.01)

(52) U.S. Cl.
CPC ......... *B62D 25/082* (2013.01); *B62D 25/088* (2013.01); *B62D 27/04* (2013.01)

(58) Field of Classification Search
CPC .... B62D 25/02; B62D 21/152; B62D 27/023; B60Y 2304/03; B60Y 2306/01
See application file for complete search history.

(56) References Cited

U.S. PATENT DOCUMENTS

| | | | | |
|---|---|---|---|---|
| 5,882,064 | A | 3/1999 | Emmons | |
| 6,193,273 | B1 | 2/2001 | Novak et al. | |
| 6,332,642 | B1 | 12/2001 | Hanyu | |
| 6,460,918 | B1 | 10/2002 | Sato et al. | |
| 6,942,281 | B2 | 9/2005 | Omori et al. | |
| 8,042,860 | B2 | 10/2011 | Takahashi et al. | |
| 9,145,172 | B2 | 9/2015 | Bae | |
| 9,868,471 | B2 | 1/2018 | An et al. | |
| 12,172,518 | B2 | 12/2024 | Rasa et al. | |
| 12,187,345 | B1 | 1/2025 | Hennessey et al. | |
| 12,337,899 | B2 | 6/2025 | Park | |
| 12,534,135 | B2 | 1/2026 | Park et al. | |
| 2003/0075952 | A1 | 4/2003 | Mochidome et al. | |
| 2003/0085579 | A1 | 5/2003 | Seksaria et al. | |
| 2003/0085591 | A1 | 5/2003 | Seksaria et al. | |
| 2003/0089545 | A1 | 5/2003 | Seksaria et al. | |
| 2003/0090128 | A1 | 5/2003 | Seksaria et al. | |
| 2003/0230443 | A1 | 12/2003 | Cramer et al. | |
| 2008/0079290 | A1 | 4/2008 | Li et al. | |
| 2013/0134742 | A1 | 5/2013 | Mildner et al. | |
| 2015/0001884 | A1 | 1/2015 | Saje et al. | |
| 2015/0290989 | A1 | 10/2015 | Kim et al. | |
| 2016/0107593 | A1 | 4/2016 | Park et al. | |
| 2016/0200361 | A1 | 7/2016 | Goto et al. | |
| 2016/0244103 | A1 | 8/2016 | Amemiya | |
| 2016/0264176 | A1 | 9/2016 | Balzer et al. | |
| 2019/0030751 | A1 | 1/2019 | Czinger et al. | |
| 2019/0047632 | A1 | 2/2019 | Kim et al. | |
| 2019/0161126 | A1 | 5/2019 | Dettling et al. | |
| 2020/0086927 | A1 | 3/2020 | Watanabe et al. | |
| 2020/0148146 | A1* | 5/2020 | Chung | B60R 19/34 |
| 2020/0180700 | A1 | 6/2020 | Kim et al. | |
| 2021/0031837 | A1 | 2/2021 | Schmidt | |
| 2021/0114665 | A1* | 4/2021 | Hong | B62D 21/11 |
| 2021/0114666 | A1 | 4/2021 | Tashiro et al. | |
| 2021/0179178 | A1 | 6/2021 | Jeong | |
| 2021/0237800 | A1 | 8/2021 | Kirita et al. | |
| 2021/0253172 | A1 | 8/2021 | Shimoda et al. | |
| 2021/0316793 | A1 | 10/2021 | Chung et al. | |
| 2022/0048570 | A1 | 2/2022 | Kim | |
| 2022/0194474 | A1 | 6/2022 | Kim | |
| 2023/0174159 | A1* | 6/2023 | Park | B62D 21/152 296/187.09 |
| 2023/0211825 | A1 | 7/2023 | Park et al. | |
| 2023/0226591 | A1 | 7/2023 | Zieta | |
| 2023/0234438 | A1 | 7/2023 | Lee | |
| 2023/0339546 | A1* | 10/2023 | Park | B62D 25/082 |
| 2023/0373563 | A1 | 11/2023 | Rai | |
| 2023/0383383 | A1 | 11/2023 | Wang et al. | |
| 2024/0124064 | A1 | 4/2024 | Bonutti et al. | |
| 2024/0375724 | A1 | 11/2024 | Pinsonneault et al. | |
| 2025/0144992 | A1 | 5/2025 | Saeki | |
| 2025/0304183 | A1 | 10/2025 | Yun et al. | |
| 2025/0313273 | A1 | 10/2025 | Yun et al. | |
| 2025/0313274 | A1 | 10/2025 | Yun et al. | |
| 2025/0326441 | A1 | 10/2025 | Yun et al. | |
| 2025/0388266 | A1 | 12/2025 | Yun et al. | |

FOREIGN PATENT DOCUMENTS

| | | | | |
|---|---|---|---|---|
| CN | 115503837 | A | 12/2022 | |
| WO | WO-2006075804 | A1 * | 7/2006 | B62D 25/082 |
| WO | WO-2017101513 | A1 * | 6/2017 | B62D 21/152 |
| WO | 2022031991 | A1 | 2/2022 | |

OTHER PUBLICATIONS

Office action cited in U.S. Appl. No. 18/816,483; May 20, 2026; 11 pp.
Office action cited in U.S. Appl. No. 18/816,525; Jun. 2, 2026; 10 pp.

* cited by examiner

FRONT SIDE BODY STRUCTURE FOR A VEHICLE

CROSS-REFERENCE TO RELATED APPLICATION

The present application claims priority to Korean Patent Application No. 10-2024-0054225 filed on Apr. 23, 2024, the entire contents of which are incorporated herein for all purposes by this reference.

BACKGROUND

Technical Field

The present disclosure relates to a front side body structure that constitutes a front side of a vehicle body of a vehicle.

Description of the Related Art

A front side body structure for a vehicle may be configured by assembling fifty or more components. In order to reduce the weight of the vehicle, methods are being studied to minimize the number of components of the front side body structure for a vehicle that has been configured by assembling fifty or more components.

When the weight of the front side body structure for a vehicle becomes lightweight, the rigidity may deteriorate.

SUMMARY

Therefore, there is a need for a front side body structure for a vehicle that may satisfy minimum rigidity requirements and weight reduction of the front side body structure for a vehicle. Accordingly, the present disclosure has been made keeping in mind the above problems occurring in the related art. The present disclosure is intended to provide a front side body structure for a vehicle that may reduce the weight of the front side body structure for a vehicle, that may satisfy rigidity capable of protecting an occupant in the event of a frontal collision of the vehicle, and that may include a fender apron member capable of uniformly dispersing a load in the event of a collision of the vehicle.

According to one aspect, a front side body structure for a vehicle is provided. The front side body structure includes: a front side member extending in a longitudinal direction of a vehicle; a shock absorber housing disposed between a front end and a rear end of the front side member and connected to the front side member; and an A-pillar connected to the rear end of the front side member. The front side member, the shock absorber housing, and the A-pillar are integrally formed. A front end of a fender apron member is connected to the front end of the front side member and a rear end of the fender apron member is inserted into an assembling groove of the shock absorber housing.

A connection bracket, to which the front end of the fender apron member is connected, may be provided at the front end of the front side member.

The assembling groove may be disposed in an outer portion of the shock absorber housing and directed toward the outside. The fender apron member may be inserted into the assembling groove and one or more points at which the fender apron member and the assembling groove adjoin may be coupled to one another.

The rear end of the fender apron member may have a larger cross-sectional area than the front end of the fender apron member.

Space may be provided at the front end of the front side member where first horizontal ribs and first vertical ribs intersect.

A connection bracket, to which the front end of the fender apron member is connected, may be provided or formed at the front end of the front side member. The front end of the fender apron member may be connected to one end of the connection bracket. The other end of the connection bracket may be disposed or formed on the same plane as a frontmost rib of the first vertical ribs formed at the front end of the front side member.

An X-shaped rib having an X shape may be formed at a rear end of the assembling groove of the shock absorber housing.

Space may be formed in any one or more of the front side member, the shock absorber housing, and the A-pillar where second horizontal ribs and second vertical ribs intersect.

An upper-end surface of the fender apron member may be positioned to be higher or lower than an upper-end surface of the shock absorber housing.

The fender apron member may have a circular cross-section or a polygonal cross-section having four or more angles.

According to the present disclosure, the fender apron member may be separately provided and coupled, which may uniformly disperse a load in the event of a collision of the vehicle. In addition, the fender apron member may be separately provided during a process of integrally forming the front side member, the shock absorber housing, and the A-pillar, which may simplify a shape of the mold.

DETAILED DESCRIPTION

Figure 1:
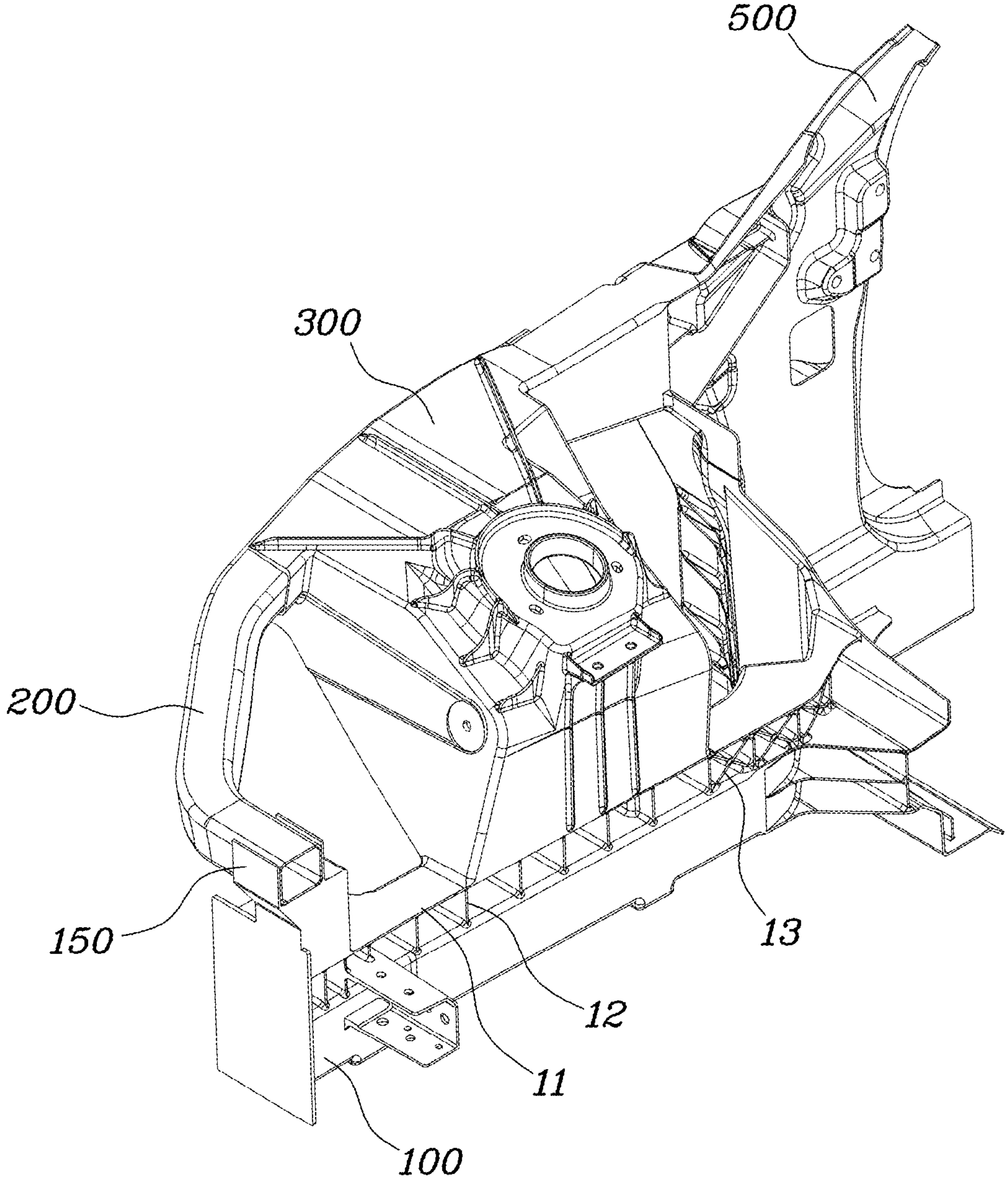
FIGS. 1 and 2 are perspective views of a front side body structure for a vehicle according to an embodiment of the present disclosure.

Hereinafter, embodiments disclosed in the present specification are described in detail with reference to the accompanying drawings. The same or similar constituent elements are assigned with the same reference numerals throughout the specification and repetitive descriptions thereof have been omitted.

In the description of the embodiments disclosed in the present specification, the specific descriptions of publicly known related technologies have been omitted where it was determined that the specific descriptions may obscure the subject matter of the embodiments disclosed in the present specification. In addition, it should be interpreted that the accompanying drawings are provided only to allow those of ordinary skill in the art to more fully understand the embodiments disclosed in the present specification. The technical spirit disclosed in the present specification is not limited by the accompanying drawings, and includes all alterations, equivalents, and alternatives that are included in the spirit and the technical scope of the present disclosure.

The terms including ordinal numbers such as “first,” “second,” and the like may be used to describe various constituent elements, but the constituent elements are not limited by the terms. These terms are used only to distinguish one constituent element from another constituent element.

Singular expressions include plural expressions unless clearly described as having different meanings in context.

When a component, device, element, or the like of the present disclosure is described as having a purpose or performing an operation, function, or the like, the component, device, or element should be considered herein as being “configured to” meet that purpose or perform that operation or function.

In the present specification, it should be understood the terms “comprises,” “comprising,” “includes,” “including,” “containing,” “has,” “having” or other variations thereof are inclusive and therefore specify the presence of stated features, integers, steps, operations, elements, components, or combinations thereof. Such terms do not preclude the presence or addition of one or more other features, integers, steps, operations, elements, components, or combinations thereof.

The suffixes “module”, “unit”, “part”, and “portion” used to describe constituent elements in the following description are used together or interchangeably in order to facilitate the description. The suffixes themselves do not have distinguishable meanings or functions.

When one constituent element is described as being “coupled” or “connected” to another constituent element, it should be understood that one constituent element can be coupled or connected directly to another constituent element. However, an intervening constituent element can also be present between the constituent elements. When one constituent element is described as being “coupled directly to” or “connected directly to” another constituent element, it should be understood that no intervening constituent element is present between the constituent elements.

Figure 2:
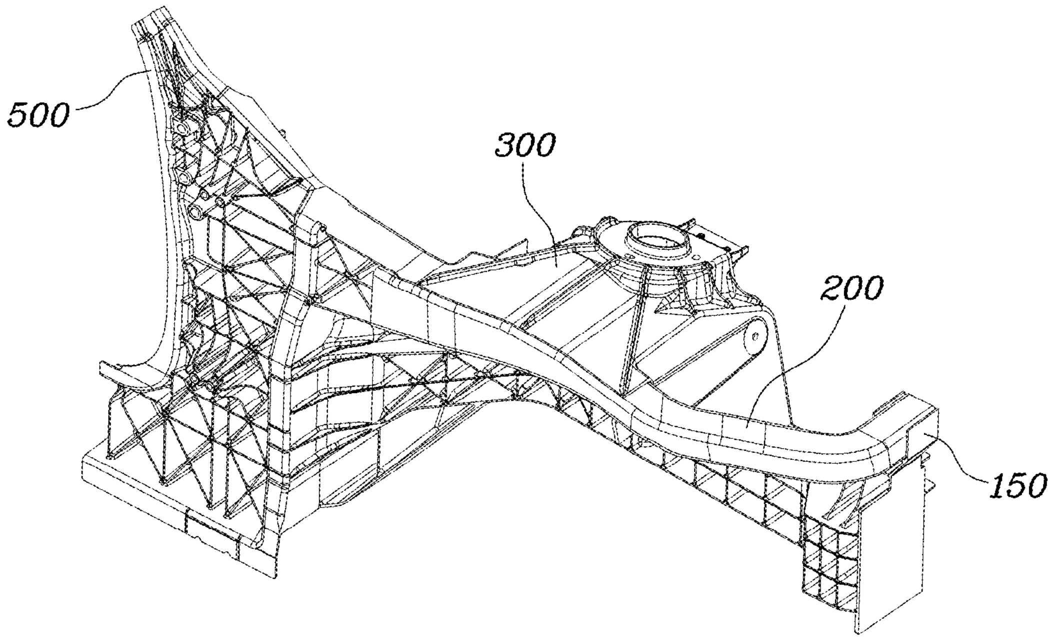

FIGS. 1 and 2 are perspective views of a front side vehicle body for a vehicle according to an embodiment of the present disclosure.

With reference to FIGS. 1 and 2, a front side structure body for a vehicle according to an embodiment of the present disclosure includes a front side member 100, a shock absorber housing 300, and an A-pillar 500. In particular, the front side body structure for a vehicle is manufactured by integrating the front side member 100, the shock absorber housing 300, and the A-pillar 500.

More specifically, the front side body structure for a vehicle refers to a lateral structure of a vehicle that extends from a front end to or toward a rear end of the vehicle. In the event of a frontal collision of the vehicle, the front side body structure for a vehicle may absorb a load (energy) and uniformly disperse the load to the entire vehicle body, thereby protecting a passenger from the collision.

The front side body structure for a vehicle may be manufactured by welding various components in addition to the front side member, the shock absorber housing, and the A-pillar. In this process, about thirty to fifty or more components may be coupled by welding.

A method of manufacturing the front side body structure for a vehicle by using welding requires forming many flanges to couple the components. This increases a weight of the front side body structure. Further, many components need to be separately manufactured, which increases the time and the number of processes required to manufacture the components and thus the body structure.

In the present disclosure, in order to solve the above-mentioned problem, some parts of the front side body structure for a vehicle may be integrated, i.e., integrally formed or provided as one piece or as a one-piece structure. This may reduce the number of processes of welding the components and reduce the weight of the front side body structure for a vehicle.

In particular, the front side member 100, the shock absorber housing 300, and the A-pillar 500, which occupy a large volume of the front side body structure for a vehicle, are integrated.

According to this method, the front side member 100, the shock absorber housing 300, and the A-pillar 500, which occupy the large volume of the front side body structure for a vehicle, are integrated, which may minimize the number of welding surfaces.

The probability of fracture of a welding surface, caused by a load, increases as the number of welding surfaces increases. The fracture of a welding surface makes it difficult to transmit a load and concentrates an excessive load on a particular portion of the structure. For this reason, another welding surface may be fractured, which makes it more difficult to disperse a load.

However, the above-mentioned method is advantageous in minimizing the number of welding surfaces and appropriately transmitting and dispersing a load.

In the front side body structure for a vehicle according to the present disclosure, a left front side vehicle body and a right front side vehicle body may be provided symmetrically and connected to each other by means of a cross bar or the like. A space in the front side vehicle body may define an engine compartment or a space in which power electric (PE) components of an electric vehicle are embedded.

Meanwhile, a fender apron member 200 may be provided separately and constitute the front side body structure for a vehicle. Specifically, a front end of the fender apron member 200 may be connected to a front end of the front side member 100. A rear end of the fender apron member 200 may be inserted into an assembling groove 380 formed in the shock absorber housing 300, thereby constituting the front side body structure for a vehicle.

Figure 3:
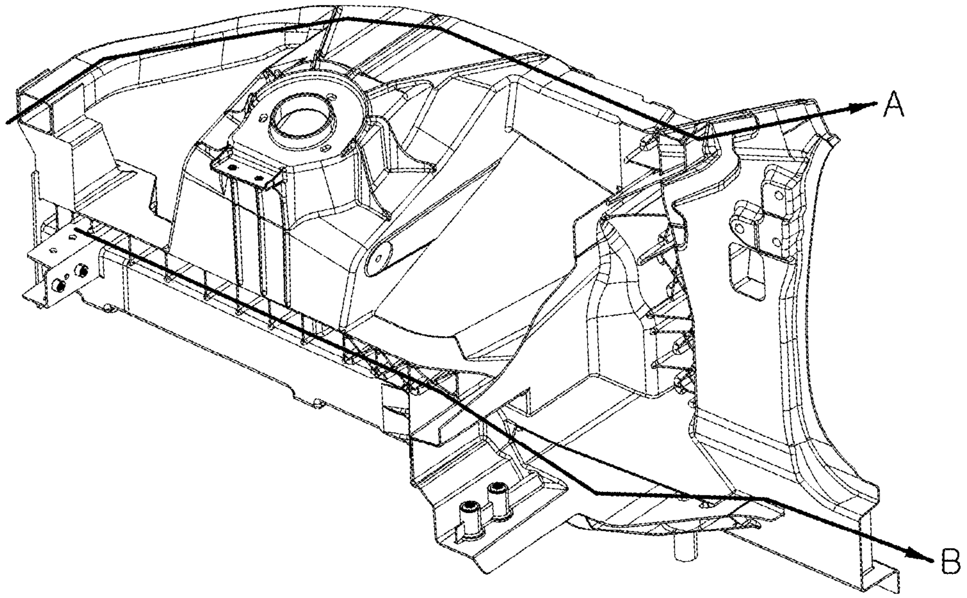
FIG. 3 is a view illustrating a main load path of the front side body structure for a vehicle of FIGS. 1 and 2.

The fender apron member 200, which is provided separately, may constitute a main path along which a load is dispersed in the event of a collision of the vehicle. With reference to FIG. 3, an impact applied to the front side member 100 may be transmitted to the A-pillar 500 through the fender apron member 200 and the shock absorber housing 300 (A).

In addition, an impact applied to the front side member 100 may be transmitted directly to the A-pillar 500 through the front side member 100 (B).

Figure 4:
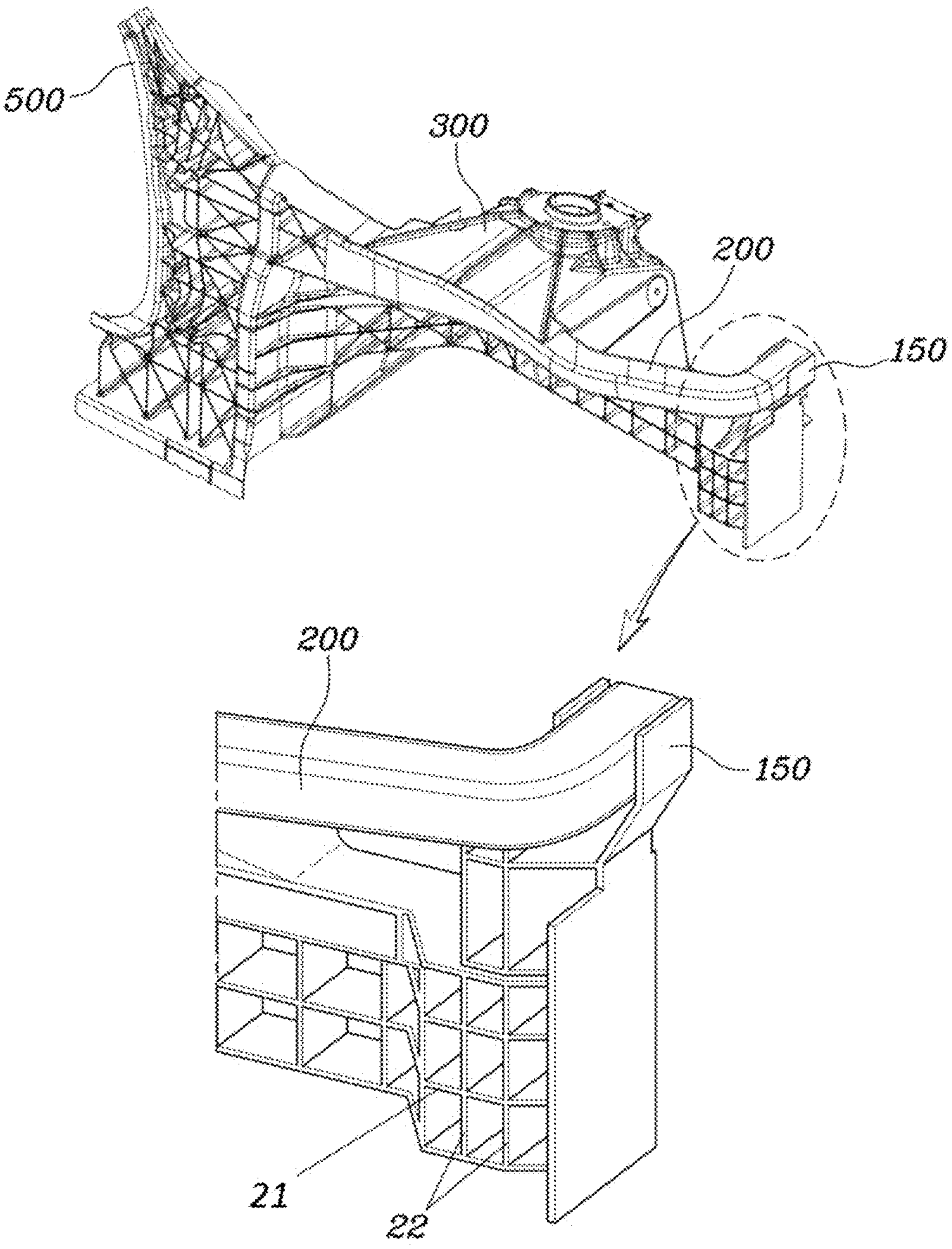
FIG. 4 is an enlarged view illustrating a front side member formed with a connection bracket.
Figure 5:
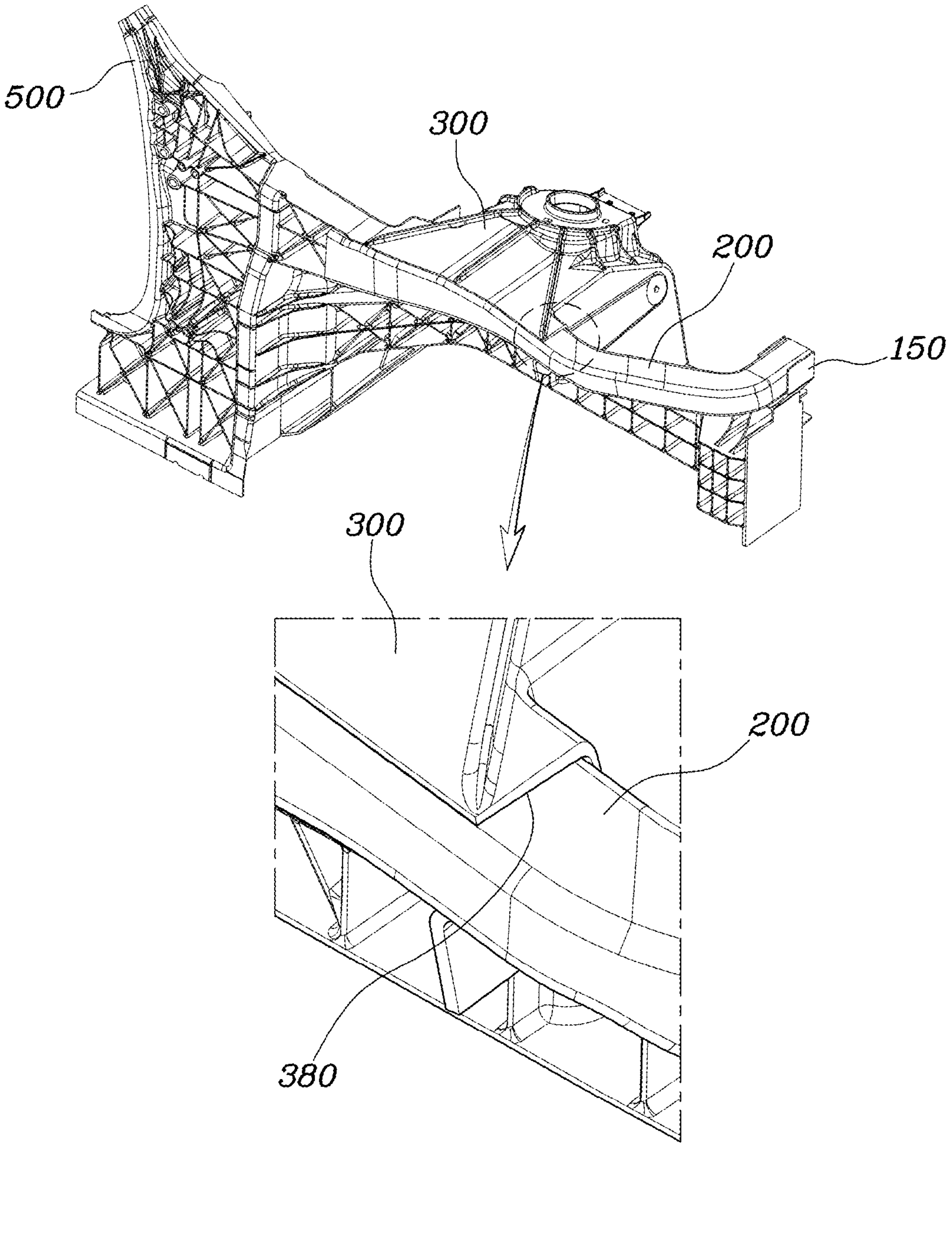
FIG. 5 is a view illustrating a state in which a fender apron member is inserted into an assembling groove.

A connection bracket 150 may be formed at a front end of the front side member 100 and the front end of the fender apron member 200 may be connected to the connection bracket 150. FIG. 4 is an enlarged view illustrating the front side member formed with a connection bracket. FIG. 5 is a view illustrating a state in which the fender apron member is inserted into the assembling groove.

With reference to FIGS. 4 and 5, the front end of the fender apron member 200, which is provided as a separate component, is connected to the front end of the front side member 100. The rear end of the fender apron member 200 is connected to the shock absorber housing 300 through the assembling groove 380.

Meanwhile, in order to ensure rigidity of the front side body structure for a vehicle that has an opened cross-section, first horizontal ribs 21 and first vertical ribs 22 may be formed at the front end of the front side member 100. The first horizontal ribs 21 and the first vertical ribs 22 may effectively disperse stress applied to the vehicle body, partially absorb stress, and improve rigidity of the opened cross-section.

In addition, the spaces defined by the first horizontal ribs 21 and the first vertical ribs 22 may absorb a load, which is generated by a collision, while providing space in which the vehicle body may be deformed by the collision. In this case, the first horizontal ribs 21 and the first vertical ribs 22 are formed to be directed toward the outside of the vehicle, and the spaces defined by the first horizontal ribs 21 and the first vertical ribs 22 may be formed to be directed toward the outside of the vehicle.

In this case, in order to uniformly transmit a load, which is applied by a frontal collision of the vehicle, to the entire vehicle body, a position at which the first vertical ribs 22 is formed may be restricted. With reference to FIG. 4, it can be ascertained that the front end of the fender apron member 200 is connected to one end of the connection bracket 150. The other end of the connection bracket 150 is formed or disposed on the same plane as a part of the front-most first vertical rib 22 formed at the front end of the front side member 100.

The front-most two first vertical ribs 22 and the two spaced apart portions on the other end of the connection bracket 150 may be respectively positioned on the same plane. The other end of the connection bracket 150 and the front end of the front side member 100 may extend in a height direction of the vehicle, thereby constituting a part of the connection bracket 150.

When the position at which the first vertical rib 22 is formed is restricted in consideration of the relationship with other components as described above, a collision load may be uniformly dispersed to the entire vehicle body in comparison with a case in which the first vertical ribs are disposed randomly.

In addition, the front end of the fender apron member 200 is coupled to the connection bracket 150 in a forward/rearward direction, which may ensure a supporting force against a frontal collision load.

Meanwhile, the assembling groove 380 may be formed in an outer portion of the shock absorber housing 300 and directed toward the outside relative to the vehicle. The fender apron member 200 may be inserted into the assembling groove 380, such that one or more points at which the fender apron member 200 and the assembling groove 380 adjoin each other may be coupled to one another.

Figure 6:
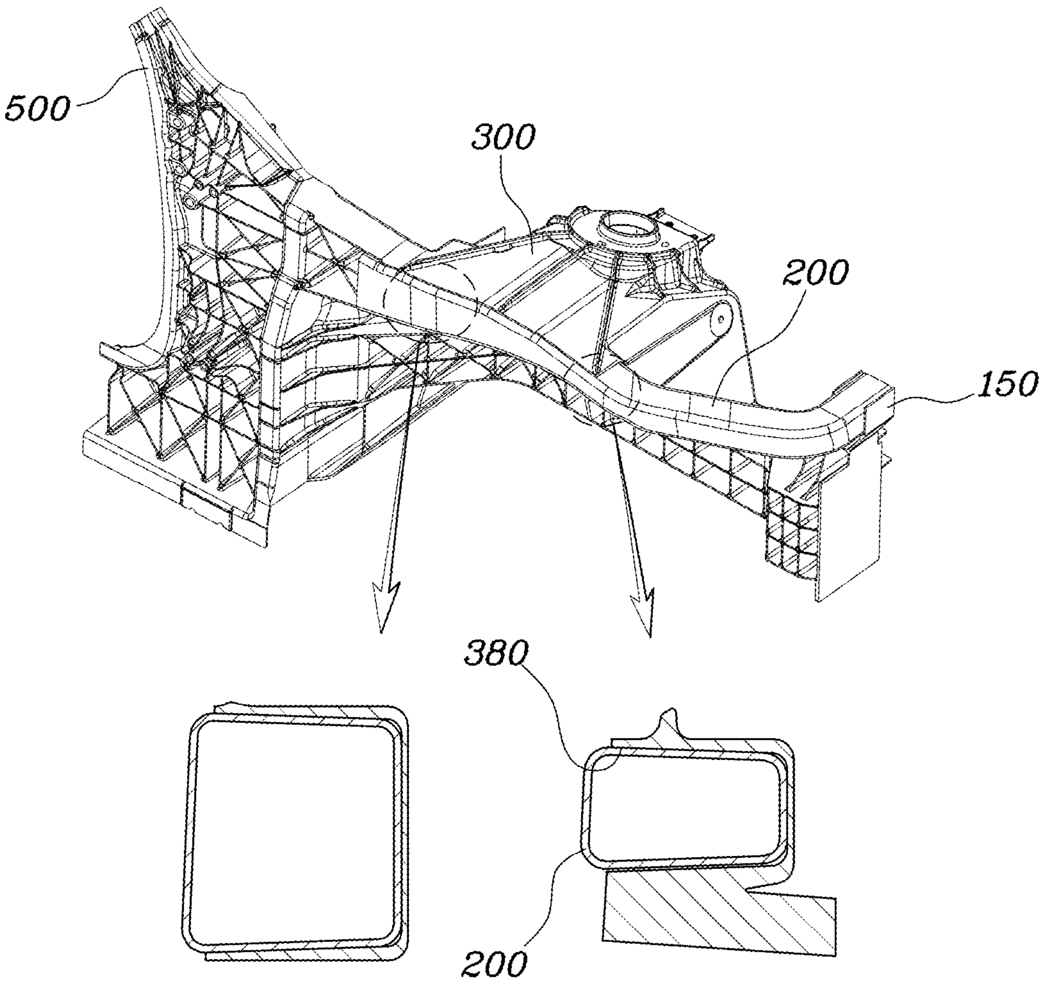
FIG. 6 is a view illustrating enlarged cross-sections in a state in which the fender apron member and the assembling groove adjoin each other.

FIG. 6 is a view illustrating cross-sections in a state in which the fender apron member 200 and the assembling groove 380 adjoin each other. With reference to FIG. 6, the fender apron member 200 may be inserted into the assembling groove 380, and three surfaces of the fender apron member 200 may adjoin the assembling groove 380. The fender apron member 200 inserted into the assembling groove 380 may be coupled to the shock absorber housing 300 in various ways such as surface welding or bonding.

Where surfaces, which adjoin in the height direction, are coupled to one another, a load of the shock absorber housing 300 in the upward/downward direction may be supported. Where surfaces, which adjoin in a width direction, are coupled to one another, a load in an outward direction may be supported.

Figure 7:
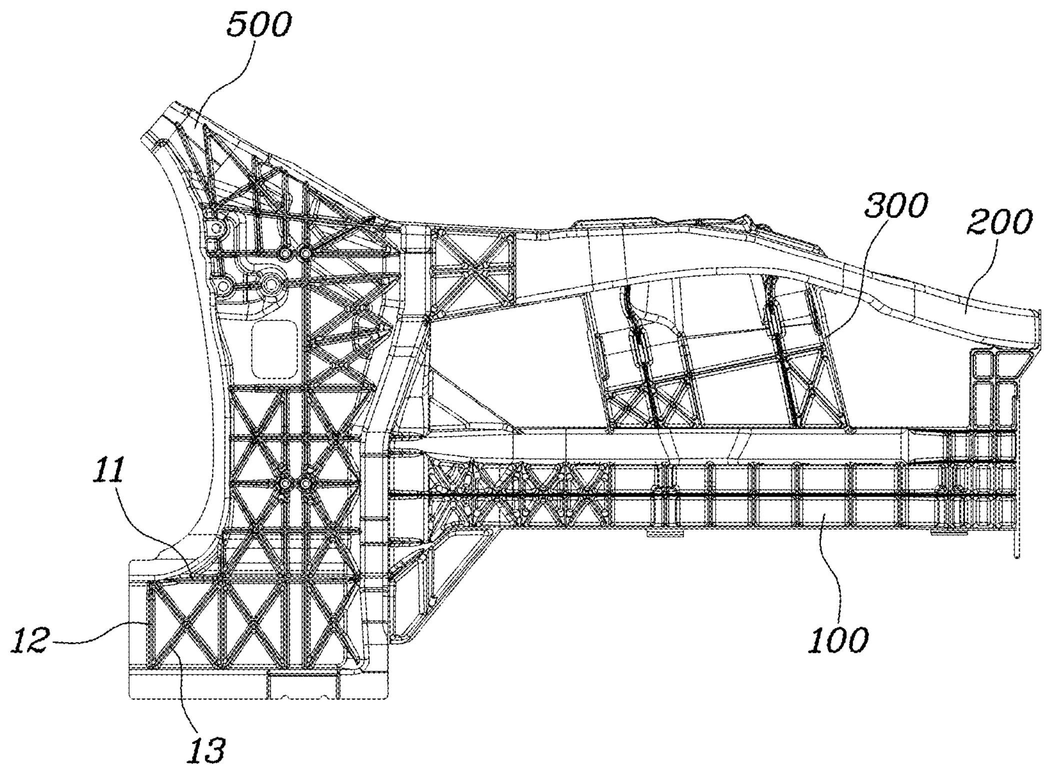
FIG. 7 is a side view of the front side body structure for a vehicle according to an embodiment of the present disclosure.

The rear end of the fender apron member 200 may have a larger cross-sectional area than the front end of the fender apron member 200. With reference to FIG. 7, a cross-sectional area of the fender apron member 200 may increase as the fender apron member 200 extends rearward. Because the cross-sectional area increases toward the rear side of the fender apron member 200, a load applied to the front side of the fender apron member 200 may be uniformly dispersed without being concentrated at a particular point. Thus, a load may be effectively dispersed to the entire vehicle body.

In accordance with the design of the vehicle, the design of the shock absorber housing 300, or a change in movement path of a load, an upper-end surface of the fender apron member 200 may be positioned to be higher than an upper-end surface of the shock absorber housing 300. Alternatively, the upper-end surface of the fender apron member 200 may be positioned to be lower than the upper-end surface of the shock absorber housing 300.

Further, a closed cross-sectional shape of the fender apron member 200 may be a quadrangular shape and have a circular cross-section or a polygonal cross-section having four or more angles. The shape of the assembling groove 380 may be changed depending on a closed cross-sectional shape of the fender apron member 200. Thus, the fender apron member 200 may be smoothly or easily inserted into and coupled to the assembling groove 380.

Meanwhile, with reference to FIG. 7, it can be ascertained that spaces are formed by a plurality of second horizontal ribs 11 and a plurality of second vertical ribs 12 formed to intersect in any one or more of the front side member 100, the shock absorber housing 300, and the A-pillar 500 of the front side body structure for a vehicle that are integrally formed.

In the event of a frontal collision, a portion to which a load is applied first is the front end of the front side member 100. Therefore, the front end of the front side member 100 needs to appropriately transmit and disperse a load while being sufficiently deformed.

To this end, the spaces, which are formed by the plurality of ribs, i.e., by the spacing and intersecting of the first horizontal ribs 21 and the first vertical ribs 22 from the front end of the front side member 100, allow the front side member 100 to be sufficiently deformed by a load caused by a frontal collision of the vehicle.

In other words, a sufficient deformation space is required to allow the front side member 100 to be deformed by a load. The front side member 100 may be sufficiently deformed by the spaces defined by the first horizontal ribs 21 and the first vertical ribs 22 and by the spaces defined by the second horizontal ribs 11 and the second vertical ribs 12. Thus, a load may be effectively transmitted to the A-pillar 500.

Further, diagonal ribs 13 may be additionally formed in any one or more of the front side member 100, the shock absorber housing 300, and the A-pillar 500 and pass through intersection points between the second horizontal ribs 11 and the second vertical ribs 12.

Because the spaces defined by the second horizontal ribs 11 and the second vertical ribs 12 is divided by the additionally formed diagonal rib 13, a cross-sectional area of the vehicle body may increase. Thus, the front side vehicle body for a vehicle may ensure higher rigidity.

If the diagonal ribs 13 are further provided, the front side vehicle body for a vehicle may additionally obtain rigidity, such that a degree of deformation caused by a load may be reduced. The sufficient deformation of the front side body structure for a vehicle is important to the transmission and dispersion of a load, but the continuous deformation of the vehicle body may cause a physical injury to a passenger. In particular, it is important to protect the passenger from a frontal collision by reducing a degree to which a vehicle body positioned to be close to the passenger is deformed.

That is to say, the second horizontal ribs 11 and the second vertical ribs 12 are formed at a front end of the front side member 100 relatively distant from the passenger, such that the front end of the front side member 100 may be sufficiently deformed. Therefore, a load may be effectively transmitted to the A-pillar 500 and dispersed. In this case, the front end of the front side member 100 may include a portion extending from a foremost end of the front side member 100 to a portion where the shock absorber housing 300 is disposed.

In contrast, a portion is defined after the portion where the shock absorber housing 300 of the front side member 100 is disposed. This portion is where the front side vehicle body for a vehicle is positioned to be relatively close to the passenger. The need to protect the passenger from the deformation of the vehicle body by reducing a deformation degree of the vehicle body increases.

Therefore, the diagonal ribs 13 may be additionally provide or formed at a rear end of the front side member 100 relatively close to the passenger. This may additionally ensure the rigidity and further reduce the degree of deformation of the vehicle body in comparison with the front end of the front side member 100. Injury to the passenger caused by the deformation of the vehicle body may thereby be prevented.

In addition to the front side member 100, the diagonal ribs 13 may be additionally formed in the A-pillar 500, which may prevent the passenger from being injured by the deformation of the vehicle body.

Likewise, X-shaped ribs 15 having an X shape may be formed at the rear end of the assembling groove 380 of the shock absorber housing 300. The X-shaped ribs 15 may also reduce a degree of deformation of the vehicle body, thereby protecting the passengers from the deformation of the vehicle body.

While specific embodiments of the present disclosure have been illustrated and described, it should be apparent to those of ordinary skill in the art that the embodiments of the present disclosure may be variously modified and changed without departing from the technical spirit of the present disclosure defined in the appended claims.

What is claimed is:

1. A front side body structure for a vehicle, the body structure comprising:

a front side member extending in a longitudinal direction of a vehicle;

a shock absorber housing disposed between a front end and a rear end of the front side member and connected to the front side member; and an A-pillar connected to the rear end of the front side member, wherein the front side member, the shock absorber housing, and the A-pillar are integrally formed, wherein a front end of a fender apron member is connected to the front end of the front side member, and wherein a rear end of the fender apron member is inserted into an assembling groove of the shock absorber housing.

2. The body structure of claim 1, wherein a connection bracket is provided at the front end of the front side member, and wherein the front end of the fender apron member is connected to the connection bracket.

3. The body structure of claim 1, wherein the assembling groove is disposed in an outer portion of the shock absorber housing and directed in an outward direction relative to the vehicle, the fender apron member is inserted into the assembling groove, and one or more points at which the fender apron member and the assembling groove adjoin are coupled to one another.

4. The body structure of claim 1, wherein the rear end of the fender apron member has a larger cross-sectional area than the front end of the fender apron member.

5. The body structure of claim 1, wherein space is provided at the front end of the front side member where first horizontal ribs and first vertical ribs intersect.

6. The body structure of claim 5, wherein:

a connection bracket is formed at the front end of the front side member;

the front end of the fender apron member is connected to the connection bracket;

the front end of the fender apron member is connected to one end of the connection bracket; and the other end of the connection bracket is disposed on the same plane as a front-most rib of the first vertical ribs.

7. The body structure of claim 1, wherein an X-shaped rib having an X shape is disposed at a rear end of the assembling groove of the shock absorber housing.

8. The body structure of claim 1, wherein space is provided in any one or more of the front side member, the shock absorber housing, or the A-pillar where second horizontal ribs and second vertical ribs intersect.

9. The body structure of claim 1, wherein an upper-end surface of the fender apron member is positioned to be higher or lower than an upper-end surface of the shock absorber housing.

10. The body structure of claim 1, wherein the fender apron member has a circular cross-section or a polygonal cross-section having four or more angles.

* * * * *